(12) United States Patent
Zhao et al.

(10) Patent No.: US 12,498,313 B2
(45) Date of Patent: Dec. 16, 2025

(54) METHODS, SYSTEMS, DEVICES, AND ELECTRONIC APPARATUSES FOR MEASURING CONCENTRATION OF WATER AND LIPIDS COMPONENTS

(71) Applicant: Beihang University, Beijing (CN)

(72) Inventors: Yanyu Zhao, Beijing (CN); Yubo Fan, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 18/230,670

(22) Filed: Aug. 7, 2023

(65) Prior Publication Data

US 2023/0375461 A1  Nov. 23, 2023

Related U.S. Application Data

(63) Continuation of application No. PCT/CN2022/131005, filed on Nov. 10, 2022.

(30) Foreign Application Priority Data

Dec. 3, 2021  (CN) .......................... 202111470552.5

(51) Int. Cl.
   *G01N 21/31*  (2006.01)
   *G01N 21/17*  (2006.01)
   *G01N 33/49*  (2006.01)

(52) U.S. Cl.
   CPC ..... *G01N 21/1702* (2013.01); *G01N 21/3151* (2013.01); *G01N 33/492* (2013.01);
   (Continued)

(58) Field of Classification Search
   CPC ........... G01N 21/1702; G01N 21/3151; G01N 33/492; G01N 2201/06146;
   (Continued)

(56) References Cited

U.S. PATENT DOCUMENTS 4,805,623 A * 2/1989 Jobsis ................ A61K 49/0002
                                                 356/41
5,269,937 A * 12/1993 Dollinger ............... G01N 30/74
                                                 436/171
(Continued)

FOREIGN PATENT DOCUMENTS

CN            1911158 A       2/2007
CN          102858233 A       1/2013
(Continued)

OTHER PUBLICATIONS

Quantitative spatial mapping of tissue water and lipid content using spatial frequency domain imaging in the 900-to 1000-nm wavelength region, published in Journal of Biomedical Optics, vol. 27, Issue 10. by Bowen Song et al.
(Continued)

*Primary Examiner* — Isiaka O Akanbi
(74) *Attorney, Agent, or Firm* — NZ Carr Law Office

(57) ABSTRACT

The embodiments of the present invention disclose a method, system, device and electronic apparatus for measuring concentration of water and lipids components. The method includes acquiring an optical absorption coefficient of a sample to be measured irradiated by a light source of at least two wavelengths, wherein a wavelength of the light source of at least two wavelengths is not greater than 1000 nm; and acquiring an extinction coefficient of water irradiated by the light source of at least two wavelengths and an extinction coefficient of lipids irradiated by the light source of at least two wavelengths; determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the
(Continued)

light source of at least two wavelengths, and the extinction coefficient of lipids irradiated by the light source of at least two wavelengths.

5 Claims, 3 Drawing Sheets

(52) U.S. Cl.
CPC .............. *G01N 2201/06146* (2013.01); *G01N 2201/0662* (2013.01)

(58) Field of Classification Search
CPC ... G01N 2201/0662; G01N 2201/0675; G01N 21/314; G01N 21/31; G01N 21/01; G01N 2021/0112; Y02A 20/20
USPC .......................................... 356/432, 364–369
See application file for complete search history.

(56) References Cited

U.S. PATENT DOCUMENTS

| | | | | |
|---|---|---|---|---|
| 6,320,657 | B1* | 11/2001 | Aspnes | G01J 3/0229 |
| | | | | 356/369 |
| 9,377,400 | B2* | 6/2016 | Wagner | G01N 15/1436 |
| 2006/0178570 | A1* | 8/2006 | Robinson | A61B 5/14558 |
| | | | | 356/369 |
| 2008/0030732 | A1* | 2/2008 | Yaroslavsky | G01J 3/10 |
| | | | | 356/369 |
| 2008/0101657 | A1* | 5/2008 | Durkin | G01N 21/4795 |
| | | | | 382/110 |
| 2008/0221409 | A1 | 9/2008 | Hoarau | |
| 2008/0221416 | A1 | 9/2008 | Baker | |
| 2009/0069653 | A1 | 3/2009 | Yoshida et al. | |
| 2009/0318815 | A1* | 12/2009 | Barnes | A61B 5/1077 |
| | | | | 382/128 |
| 2010/0256920 | A1* | 10/2010 | Amano | A61B 5/14532 |
| | | | | 356/342 |
| 2012/0127557 | A1 | 5/2012 | Masumura | |
| 2013/0057861 | A1* | 3/2013 | Ishii | G01N 21/21 |
| | | | | 356/369 |
| 2013/0094025 | A1 | 4/2013 | Nishida et al. | |
| 2015/0374276 | A1* | 12/2015 | Farkas | A61B 5/443 |
| | | | | 600/407 |
| 2016/0302669 | A1* | 10/2016 | Cuccia | A61B 5/0075 |
| 2017/0079741 | A1 | 3/2017 | Makinouchi | |
| 2019/0310239 | A1* | 10/2019 | Roblyer | G01N 21/474 |
| 2021/0255488 | A1 | 8/2021 | Piestun et al. | |

FOREIGN PATENT DOCUMENTS

| | | |
|---|---|---|
| CN | 105424652 A | 3/2016 |
| CN | 105510253 A | 4/2016 |
| CN | 105866035 A | 8/2016 |
| CN | 108403084 A | 8/2018 |
| CN | 108780042 A | 11/2018 |
| CN | 110095081 A | 8/2019 |
| WO | 2013031216 A1 | 3/2013 |
| WO | 2021127784 A1 | 7/2021 |
| WO | 2021210642 A1 | 10/2021 |

OTHER PUBLICATIONS

Shortwave-infrared meso-patterned imaging enables label-free mapping of tissue water and lipid content, published in Nature Communications, vol. 11, first Issue by Yanyu Zhao et al.

* cited by examiner

METHODS, SYSTEMS, DEVICES, AND ELECTRONIC APPARATUSES FOR MEASURING CONCENTRATION OF WATER AND LIPIDS COMPONENTS

CROSS REFERENCE

The present application is a continuation of International Patent Application No. PCT/CN2022/131005 filed on Nov. 10, 2022, which claims the benefit of priority from the Chinese Patent Application No. 202111470552.5 filed on Dec. 3, 2021, entitled "METHODS, SYSTEMS, DEVICES, AND ELECTRONIC APPARATUSES FOR MEASURING CONCENTRATION OF WATER AND LIPIDS COMPONENTS", the entire content of which is incorporated herein by reference.

TECHNICAL FIELD

Embodiments of the present invention relates to the field of optical technology, in particular to a method, system, device, and electronic apparatus for measuring concentration of water and lipids components.

BACKGROUND

Currently, in the field of spatial frequency domain imaging, it is often necessary to use shortwave infrared detectors in 1000-1300 nm wave band to quantitatively measure water and lipids components in scattering media such as biological tissue. Shortwave infrared detectors with measurement wavelengths in the range of 1000-1300 nm wave band require special detectors that are sensitive to the above wave band, such as shortwave infrared cameras. Compared to ordinary cameras, detector photosensitive chips of the shortwave infrared cameras are often expensive due to the use of special materials such as indium gallium arsenic, and there is also a problem of embargo for such cameras.

Therefore, how to use a relatively inexpensive and ordinary camera to quantitatively measure water and lipids in scattering media still requires further solutions.

SUMMARY

Some of the embodiments of the present invention provide a method, system, device and electronic apparatus for measuring concentration of water and lipids components, which are used to accurately and quantitatively measure water and lipids in a scattering media using a relatively inexpensive and ordinary camera.

The embodiments of the present invention adopt the following technical solutions.

In a first aspect, a method for measuring concentration of water and lipids components is provided, the method comprises:
  acquiring an optical absorption coefficient of a sample to be measured irradiated by a light source of at least two wavelengths, wherein a wavelength of the light source of at least two wavelengths is not greater than 1000 nm; and
  acquiring an extinction coefficient of water irradiated by the light source of at least two wavelengths and an extinction coefficient of lipids irradiated by the light source of at least two wavelengths;
  determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

In a second aspect, a system for measuring concentration of water and lipids components is provided, the system comprises: a light source, a spatial light modulator, a camera, and a processor, wherein:
  the light source of at least two wavelengths irradiates on a sample to be measured through the spatial light modulator, wherein a wavelength of the light source of at least two wavelengths is not greater than 1000 nm;
  the camera acquires an optical absorption coefficient of a sample to be measured irradiated by the light source of at least two wavelengths, respectively;
  the processor determines a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

In a third aspect, a device for measuring concentration of water and lipids components is provided, the device comprises:
  a first acquisition module, for acquiring an optical absorption coefficient of a sample to be measured irradiated by a light source of at least two wavelengths, wherein a wavelength of the light source of at least two wavelengths is not greater than 1000 nm; and
  a second acquisition module, for acquiring an extinction coefficient of water irradiated by the light source of at least two wavelengths and an extinction coefficient of lipids irradiated by the light source of at least two wavelengths;
  a concentration determination module, for determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

In a fourth aspect, an electronic apparatus is provided, comprising: a storage, a processor, and a computer program stored in the storage and executable by the processor, the computer program, when executed by the processor, performs the following steps:
  acquiring an optical absorption coefficient of a sample to be measured irradiated by a light source of at least two wavelengths, wherein a wavelength of the light source of at least two wavelengths is not greater than 1000 nm; and
  acquiring an extinction coefficient of water irradiated by the light source of at least two wavelengths and an extinction coefficient of lipids irradiated by the light source of at least two wavelengths;
  determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

In a fifth aspect, a computer readable storage media is provided, with a computer program stored thereon, the computer program, when executed by a processor, causes a processor to perform the following steps:

acquiring an optical absorption coefficient of a sample to be measured irradiated by a light source of at least two wavelengths, wherein a wavelength of the light source of at least two wavelengths is not greater than 1000 nm; and acquiring an extinction coefficient of water irradiated by the light source of at least two wavelengths and an extinction coefficient of lipids irradiated by the light source of at least two wavelengths;

determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

At least one of the above technical solutions adopted in the embodiments of the present invention can achieve the following beneficial effects.

The embodiments of the present disclosure can acquire an optical absorption coefficient of a sample to be measured irradiated by a light source of at least two wavelengths, wherein a wavelength of the light source of at least two wavelengths is not greater than 1000 nm; and acquire an extinction coefficient of water irradiated by the light source of at least two wavelengths and an extinction coefficient of lipids irradiated by the light source of at least two wavelengths; finally determine a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths. Due to the ability to use a light source with a wave band of wavelength below 1000 nm to irradiate on a sample to be measured and determine an optical absorption coefficient, and the optical absorption coefficient acquired with the light source of this wave band can be directly used for ordinary cameras. On one hand, measurement cost is greatly reduced, and on the other hand, only measuring an optical absorption coefficient of a sample to be measured irradiated by a light source of at least two wavelengths can also simplify measurement process of determining a concentration of water in the sample to be measured and a concentration of lipids in the sample to be measured.

BRIEF DESCRIPTION OF DRAWINGS

The accompanying drawings are used to provide further understanding of the present disclosure and constitute a part of the present disclosure. The schematic embodiments and their descriptions of the present disclosure are used to explain the present disclosure and are not intended to limit the present disclosure. In the drawings.

DETAILED DESCRIPTION

In order to make the objectives, technical solutions and advantages of the present disclosure clearer, the technical solutions of the present disclosure will be clearly and completely described below with reference to the specific embodiments of the present disclosure and corresponding drawings. Obviously, the described embodiments are only a part of the embodiments of the present disclosure, but not all of the embodiments. Based on the embodiments in the present disclosure, all other embodiments acquired by those skilled in the art without creative work will fall within the protection scope of the present disclosure.

To achieve accurate quantitative measurements of water and lipids in scattering media using a relatively inexpensive and ordinary camera, the embodiments of the present disclosure provides a method for measuring concentration of water and lipids components. The execution subject of the method provided by the embodiments of the present disclosure can be, but not limited to, at least one of devices that can be configured to perform the method provided by the embodiments of the present invention, such as a personal computer, a server, a terminal device, and the like.

For ease of description, take the execution subject of the method as a terminal device capable of executing the method as an example, to introduce the implementation of the method. It can be understood that the execution subject of the method as a terminal device is only an exemplary explanation and should not be understood as a limitation of this method.

Figure 1:
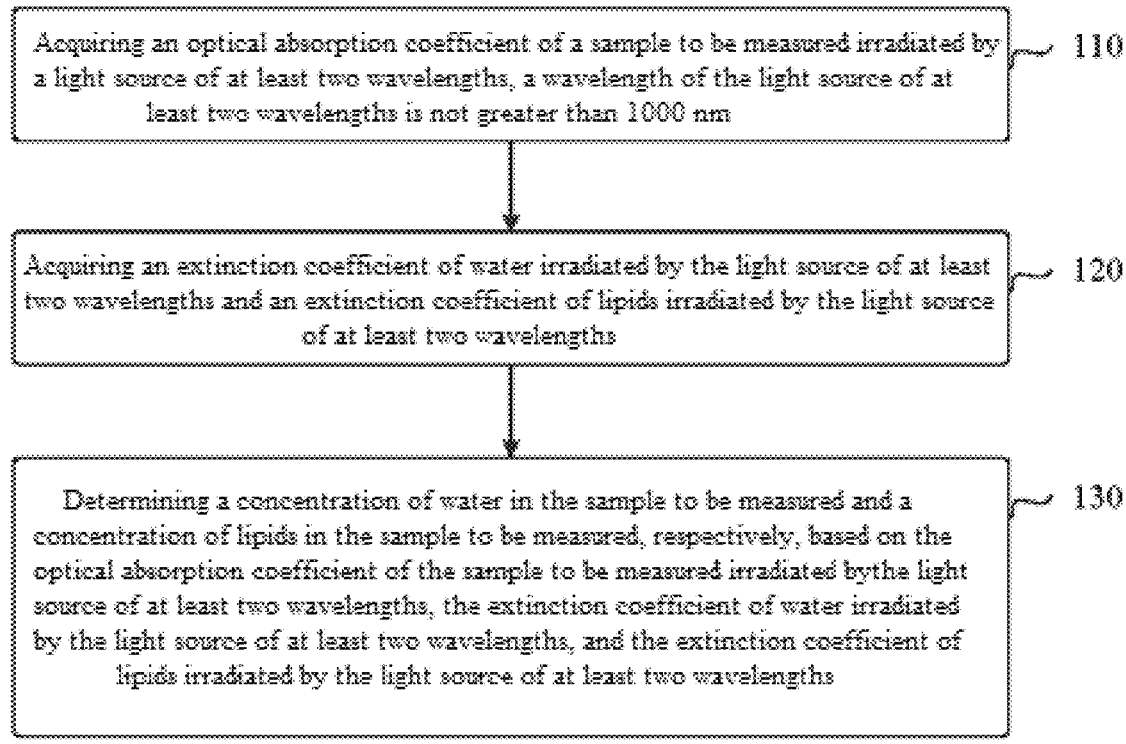
FIG. 1 is a schematic flowchart illustrating the implementation of a method for measuring concentration of water and lipids components provided by one embodiment of the present disclosure.

Specifically, a schematic flowchart of implementing a method for measuring concentration of water and lipids components provided by one or more embodiments of the present disclosure is shown in FIG. 1, wherein the method comprises:

Step 110: acquiring an optical absorption coefficient of a sample to be measured irradiated by a light source of at least two wavelengths, wherein a wavelength of the light source of at least two wavelengths is not greater than 1000 nm.

About acquiring an optical absorption coefficient of a sample to be measured irradiated by a light source of at least two wavelengths, an optical absorption coefficient of a sample to be measured irradiated by a light source of at least two wavelengths can be acquired by spatial frequency domain imaging. A structured light used in spatial frequency domain imaging typically has a specific spatial frequency (e.g., 0-0.5 mm$^{-1}$). The embodiments of the present disclosure, based on the principle that samples to be measured with different absorption and scattering properties have different response images to structured light at different spatial frequencies, use several spatial frequencies of a light source of multiple wavelengths to measure a sample to be measured, and calculate absorption and scattering coefficients of the sample to be measured. Information such as size and distribution of main components and internal components of the sample to be measured can be inferred from the absorption and scattering coefficients of the sample to be measured (such as, biological tissue). For example, by measuring the absorption coefficient of the sample to be measured irradiated by the light source of multiple wavelengths, it is possible to calculate the component information of the sample to be measured, such as hemoglobin content, blood oxygen, water concentration, and lipids concentration.

Figure 2:
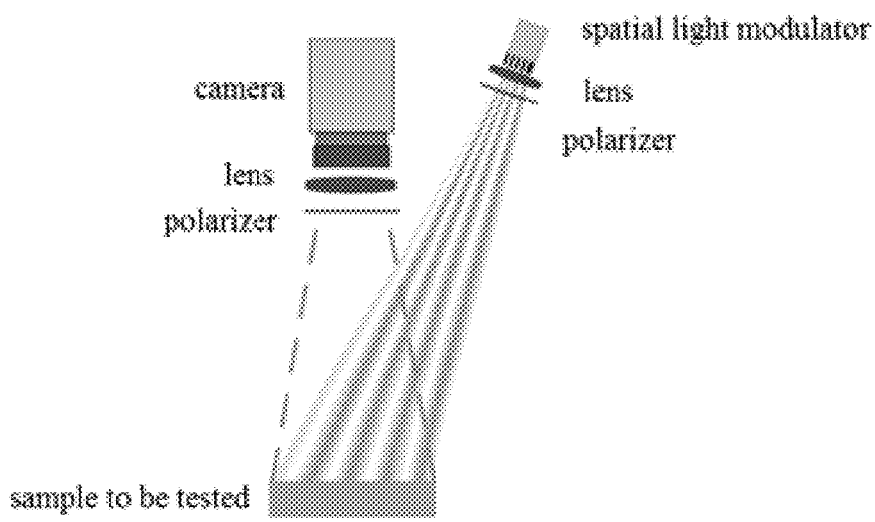
FIG. 2 is a schematic diagram of the application of a method for measuring concentration of water and lipids components provided by one embodiment of the present disclosure in a practical scenario.

FIG. 2 is a schematic diagram of the application of a method for measuring concentration of water and lipids components provided by one embodiment of the present disclosure in a practical scenario. In FIG. 2, light emitted by a light source reaches a spatial light modulator, is subjected to spatial frequency modulation, and then irradiates onto a sample to be measured (which specifically can be a biological tissue). By measuring at least two spatial frequencies, it is possible to calculate an optical absorption coefficient and a scattering coefficient of the sample to be measured when the light source irradiates on the sample to be measured using a known correspondence relationship (i.e., image responses corresponding to the absorption coefficient and scattering coefficient of the same sample to be measured at different spatial frequencies under the irradiation of a light source of the same wavelength are different). Absorption coefficient spectrum and scattering coefficient spectrum of the sample to be measured can be acquired by measuring under the irradiation of a light source of multiple wavelengths.

Optionally, acquiring an optical absorption coefficient of a sample to be measured irradiated by a light source of at least two wavelengths comprises:
  acquiring an optical absorption coefficient of the sample to be measured irradiated by the light source of at least two wavelengths through a spatial light modulator.

Optionally, acquiring an optical absorption coefficient of the sample to be measured irradiated by the light source of at least two wavelengths through the spatial light modulator comprises:
  acquiring an optical absorption coefficient of the sample to be measured irradiated by the light source of at least two wavelengths by an ordinary camera through the spatial light modulator.

Optionally, in order to acquire the optical absorption coefficient of the sample to be measured irradiated by the light source using an ordinary camera, a wavelength range of the light source of at least two wavelengths is between 900 nm and 1000 nm.

Figure 3:
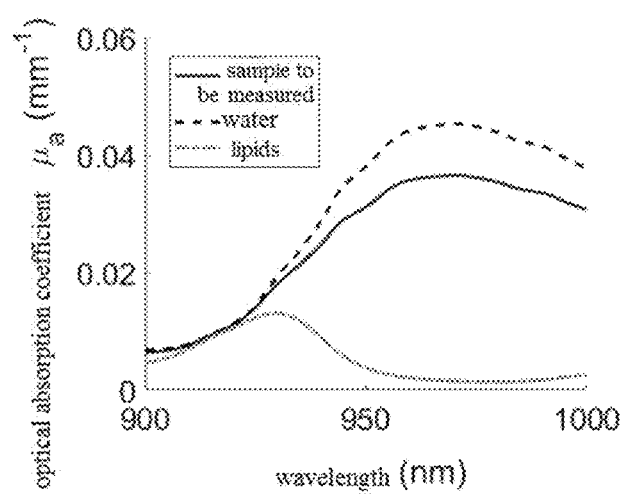
FIG. 3 is, in a method for measuring concentration of water and lipids components provided by one embodiment of the present disclosure, a schematic diagram of an absorption coefficient of water, lipids, and a sample to be measured irradiated by a light source with a wave band of a wavelength between 900-1000 nm.

FIG. 3 is, in a method for measuring concentration of water and lipids components provided by one embodiment of the present disclosure, a schematic diagram of an absorption coefficient of water, lipids, and a sample to be measured irradiated by a light source with a wave band of a wavelength between 900-1000 nm. As can be seen from FIG. 3, when the wavelength of the light source is 930 nm, the absorption coefficient of lipids irradiated by the light source can reach a peak, and when the wavelength of the light source is 970 nm, the absorption coefficient of water irradiated by the light source can reach a peak. Specifically, the at least two wavelengths described above can comprise:
  930 nm;
  970 nm.
  Step 120: acquiring an extinction coefficient of water irradiated by the light source of at least two wavelengths and an extinction coefficient of lipids irradiated by the light source of at least two wavelengths.

The extinction coefficient of water irradiated by the light source of at least two wavelengths and the extinction coefficient of lipids irradiated by the light source of at least two wavelengths can be acquired from known theories.
  Step 130: determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

The optical absorption coefficient spectrum between those of water and lipids illustrated in FIG. 3 is the optical absorption coefficient spectrum of the sample to be measured in the embodiments of the present disclosure. The optical absorption coefficients in the optical absorption coefficient spectrum of the sample to be measured can be expressed as the sum of the products of the concentrations of each main light absorbing substances in the sample to be measured and the extinction coefficients of the substances.

Optionally, determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths, comprises:
  determining a concentration of water in the sample to be measured and a concentration of lipids in the sample to be measured, respectively, based on the optical absorption coefficient of the sample to be measured irradiated by the light source of at least two wavelengths $\lambda$, the extinction coefficient of water irradiated by the light source of at least two wavelengths $\lambda$, the extinction coefficient of lipids irradiated by the light source of at least two wavelengths $\lambda$, and a formula $\mu_a(\lambda) = \varepsilon_{H2O}(\lambda) \times C_{H2O} + \varepsilon_{lipid}(\lambda) \times C_{lipid}$;
  wherein, the $\mu_a(\lambda)$ is the optical absorption coefficient of the sample to be measured irradiated by the light source of at least two wavelengths $\lambda$; the $\varepsilon_{H2O}(\lambda)$ is the extinction coefficient of water irradiated by the light source of at least two wavelengths $\lambda$; the $\varepsilon_{lipid}(\lambda)$ is the extinction coefficient of lipids irradiated by the light source of at least two wavelengths $\lambda$; the $C_{H2O}$ is the concentration of water in the sample to be measured; and the $C_{lipid}$ is the concentration of lipids in the sample to be measured.

After measuring the optical absorption coefficient of the sample to be measured irradiated by the light source of at least two wavelengths $\lambda$, at least two equations can be combined to calculate the concentration of water in the sample to be measured and the concentration of lipids in the sample to be measured. For example, after measuring the optical absorption coefficients $\mu_a(930)$ and $\mu_a(970)$ of the sample to be measured irradiated by the light source of wavelengths 930 nm and 970 nm, acquiring the extinction coefficients of water $\varepsilon_{H2O}(930)$ and $\varepsilon_{H2O}(970)$ irradiated by the light source of at least two wavelengths $\lambda$, and acquiring the extinction coefficients of lipids $\varepsilon_{lipid}(930)$ and $\varepsilon_{lipid}(970)$ irradiated by the light source of at least two wavelengths $\lambda$, the following equation set can be combined to calculate the concentration of water $C_{H2O}$ in the sample to be measured and the concentration of lipids $C_{lipid}$ in the sample to be measured.

$$\begin{cases} \mu_a(930) = \varepsilon_{H2O}(930) \times C_{H2O}H2O + \varepsilon_{lipid}(930) \times C_{lipid} \\ \mu_a(970) = \varepsilon_{H2O}(970) \times C_{H2O}H2O + \varepsilon_{lipid}(970) \times C_{lipid} \end{cases}$$

The embodiments of the present disclosure can acquire an optical absorption coefficient of a sample to be measured irradiated by a light source of at least two wavelengths, wherein a wavelength of the light source of at least two wavelengths is not greater than 1000 nm; and acquire an extinction coefficient of water irradiated by the light source of at least two wavelengths and an extinction coefficient of lipids irradiated by the light source of at least two wavelengths; finally determine a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths. Due to the ability to use a light source with a wave band of wavelength below 1000 nm to irradiate on a sample to be measured and determine an optical absorption coefficient, and the optical absorption coefficient acquired by the light source of this wave band can be directly used for common cameras. On one hand, measurement cost is greatly reduced, and on the other hand, only measuring an optical absorption coefficient of a sample to be measured irradiated by a light source of at least two wavelengths can also simplify measurement process of determining a concentration of water in the sample to be measured and a concentration of lipids in the sample to be measured.

Figure 4:
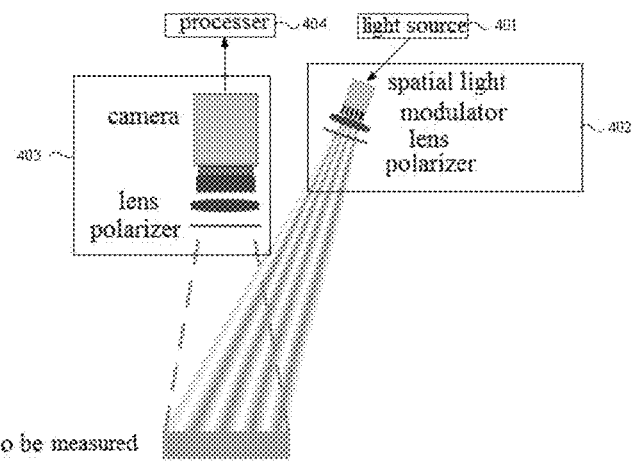
FIG. 4 is a structure schematic diagram of a system for measuring concentration of water and lipids components provided by one embodiment of the present disclosure.

FIG. 4 is a structure schematic diagram of a system 400 for measuring concentration of water and lipids components provided by one embodiment of the present disclosure. In a software implementation, the system 400 for measuring concentration of water and lipids components can comprise a light source 401, a spatial light modulator 402, a camera 403, and a processor 404, wherein:

the light source 401 of at least two wavelengths irradiates on a sample to be measured through the spatial light modulator 402, wherein a wavelength of the light source of at least two wavelengths is not greater than 1000 nm;

the camera 403 acquires an optical absorption coefficient of the sample to be measured irradiated by the light source of at least two wavelengths, respectively;

the processor 404 determines a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

Optionally, in an implementation, the wavelength range of the light source of at least two wavelengths is between 900 nm and 1000 nm.

Optionally, in an implementation, the at least two wavelengths comprise:
930 nm;
970 nm.

Optionally, in an implementation, the processor 404 is used for:

determining a concentration of water in the sample to be measured and a concentration of lipids in the sample to be measured, respectively, based on the optical absorption coefficient of the sample to be measured irradiated by the light source of at least two wavelengths $\lambda$, the extinction coefficient of water irradiated by the light source of at least two wavelengths $\lambda$, the extinction coefficient of lipids irradiated by the light source of at least two wavelengths $\lambda$, and a formula $\mu_a(\lambda) = \varepsilon_{H2O}(\lambda) \times C_{H2O} + \varepsilon_{lipid}(\lambda) \times C_{lipid}$;

wherein, the $\mu_a(\lambda)$ is the optical absorption coefficient of the sample to be measured irradiated by the light source of at least two wavelengths $\lambda$; the $\varepsilon_{H2O}(\lambda)$ is the extinction coefficient of water irradiated by the light source of at least two wavelengths $\lambda$; the $\varepsilon_{lipid}(\lambda)$ is the extinction coefficient of lipids irradiated by the light source of at least two wavelengths $\lambda$; the $C_{H2O}$ is the concentration of water in the sample to be measured; and the $C_{lipid}$ is the concentration of lipids in the sample to be measured.

The system 400 for measuring concentration of water and lipids components can implement the method of the method embodiments illustrated in FIGS. 1 to 3. For details, please refer to the method for measuring concentration of water and lipids components of the embodiments illustrated in FIGS. 1 to 3, and will not be described again.

Figure 5:
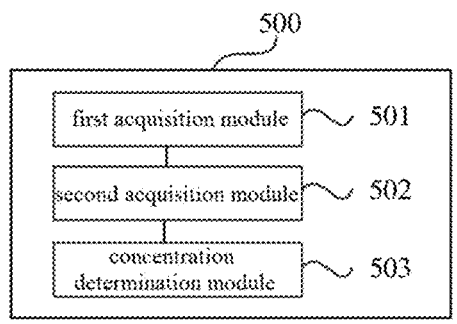
FIG. 5 is a structure schematic diagram of a device for measuring concentration of water and lipids components provided by one embodiment of the present disclosure.

FIG. 5 is a structure schematic diagram of a device 500 for measuring concentration of water and lipids components provided by one embodiment of the present disclosure. In a software implementation, the device 500 for measuring concentration of water and lipids components can comprise:

a first acquisition module 501, for acquiring an optical absorption coefficient of a sample to be measured irradiated by a light source of at least two wavelengths, wherein a wavelength of the light source of at least two wavelengths is not greater than 1000 nm; and a second acquisition module 502, for acquiring an extinction coefficient of water irradiated by the light source of at least two wavelengths and an extinction coefficient of lipids irradiated by the light source of at least two wavelengths;

a concentration determination module 503, for determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

Optionally, in an implementation, the wavelength range of the light source of at least two wavelengths is between 900 nm and 1000 nm.

Optionally, in an implementation, the at least two wavelengths comprise:
930 nm;
970 nm.

Optionally, in an implementation, the first acquisition module 501 is used for:
acquiring an optical absorption coefficient of the light source of at least two wavelengths irradiated on a sample to be measured through a spatial light modulator.

Optionally, in an implementation, the first acquisition module 501 is used for:
acquiring an optical absorption coefficient of a sample to be measured irradiated by the light source of at least two wavelengths through the spatial light modulator by a common camera.

Optionally, in an implementation, the concentration determination module 503 is used for:
determining a concentration of water in the sample to be measured and a concentration of lipids in the sample to be measured, respectively, based on the optical absorption coefficient of the sample to be measured irradiated by the light source of at least two wavelengths $\lambda$, the extinction coefficient of water irradiated by the light source of at least two wavelengths $\lambda$, the extinction coefficient of lipids irradiated by the light source of at least two wavelengths $\lambda$, and a formula $\mu_a(\lambda)=\varepsilon_{H2O}(\lambda) \times C_{H2O} + \varepsilon_{lipid}(\lambda) \times C_{lipid}$;

wherein, the $\mu_a(\lambda)$ is the optical absorption coefficient of the sample to be measured irradiated by the light source of at least two wavelengths $\lambda$; the $\varepsilon_{H2O}(\lambda)$ is the extinction coefficient of water irradiated by the light source of at least two wavelengths $\lambda$; the $\varepsilon_{lipid}(\lambda)$ is the extinction coefficient of lipids irradiated by the light source of at least two wavelengths $\lambda$; the $C_{H2O}$ is the concentration of water in the sample to be measured; and the $C_{lipid}$ is the concentration of lipids in the sample to be measured.

The device 500 for measuring concentration of water and lipids components can implement the method of the method embodiments illustrated in FIGS. 1 to 3. For details, please refer to the method for measuring concentration of water and lipids components of the embodiments illustrated in FIGS. 1 to 3, and will not be described again.

Figure 6:
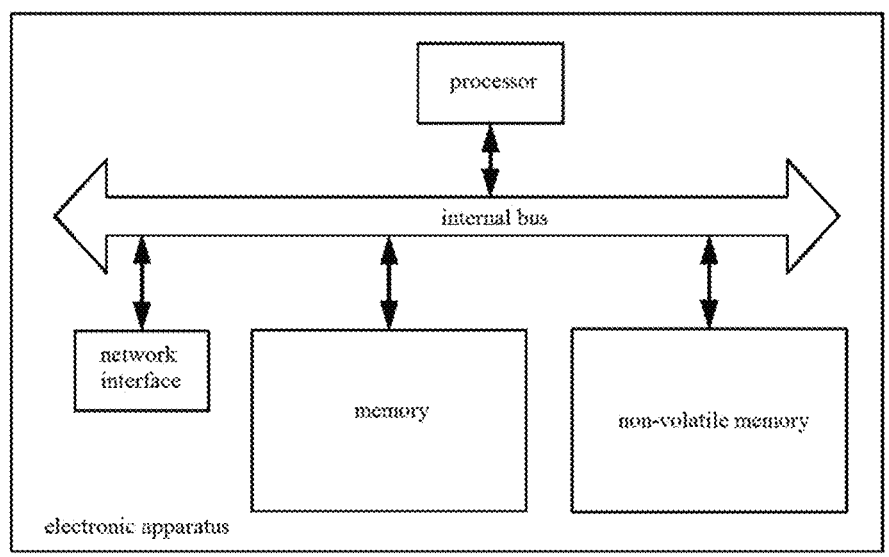
FIG. 6 is a structure schematic diagram of hardware of an electronic apparatus provided by one embodiment of the present disclosure.

FIG. 6 is a structure schematic diagram of an electronic apparatus provided by one embodiment of the present disclosure. Referring to FIG. 6, at the hardware level, the electronic apparatus comprises a processor, optionally also comprises an internal bus, a network interface, and a storage. Wherein, the storage may comprise a memory, such as high-speed random-access memory (RAM), and may also comprise non-volatile memory, such as at least one disk memory. Of course, the electronic apparatus may also comprise hardware required for other businesses.

The processor, network interface, and storage can be interconnected via the internal bus, which can be an ISA (Industry Standard Architecture) bus, a PCI (Peripheral Component Interconnect) bus, or an EISA (Extended Industry Standard Architecture) bus, etc. The bus can be divided into address bus, data bus, control bus, etc. For ease of representation, in FIG. 6, only one bidirectional arrow is used to represent the bus, but it does not indicate that there is only one bus or one type of bus.

The storage is used for storing programs. Specifically, the program can include program code that includes computer operating instructions. The storage can also include memory and non-volatile memory, and provide instructions and data to the processor.

The processor reads corresponding computer programs from the non-volatile memory into the memory and then runs them to form a device for measuring concentration of water and lipids components on a logical level. The processor executes the programs stored in the storage and is specifically used to perform the following operations:
acquiring an optical absorption coefficient of a sample to be measured irradiated by a light source of at least two wavelengths, wherein a wavelength of the light source of at least two wavelengths is not greater than 1000 nm; and
acquiring an extinction coefficient of water irradiated by the light source of at least two wavelengths and an extinction coefficient of lipids irradiated by the light source of at least two wavelengths;
determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

The method for measuring concentration of water and lipids components disclosed in the embodiment illustrated in FIG. 1 of the present disclosure can be applied to the processor or implemented by the processor. The processor can be an integrated circuit chip with signal processing capabilities. During the implementation process, each step of the above method can be completed through integrated logic circuits of hardware in the processor or instructions in the form of software. The processor described above can be a general-purpose processor, including a central processing unit (CPU), a network processor (NP), and the like; It can also be a digital signal processor (DSP), application specific integrated circuit (ASIC), field-programmable gate array (FPGA), or other programmable logic devices, discrete gates or transistor logic devices, or discrete hardware components. The methods, steps, and logical block diagrams disclosed in one or more embodiments of the present disclosure can be implemented or executed. The general-purpose processor may be a microprocessor or the processor may also be any conventional processor or the like. The steps of the method disclosed in connection with one or more embodiments of the present disclosure can be directly embodied in the completion of execution by a hardware decoding processor, or can be executed using a combination of hardware and software modules in a decoding processor. The software module can be located in RAM, flash memory, read-only memory, programmable read-only memory, or electrically erasable programmable memory, registers, and other mature storage media in the field. The storage media is located in the storage, and the processor reads the information from the storage and completes the steps of the above method in combination with its hardware.

The electronic apparatus can also perform the method for measuring concentration of water and lipids components illustrated in FIG. 1, which will not be repeated in the present disclosure.

The embodiment of the present disclosure also proposes a computer readable storage media with one or more programs stored thereon. The one or more programs include instructions that, when executed by a portable electronic apparatus including multiple application programs, can cause the portable electronic apparatus to execute the method of the embodiment illustrated in FIG. 1, and are specifically used to perform the following operations:

acquiring an optical absorption coefficient of a sample to be measured irradiated by a light source of at least two wavelengths, wherein a wavelength of the light source of at least two wavelengths is not greater than 1000 nm; and acquiring an extinction coefficient of water irradiated by the light source of at least two wavelengths and an extinction coefficient of lipids irradiated by the light source of at least two wavelengths;

determining a concentration of water in the sample to be measured and a concentration of lipids in the sample to be measured, respectively, based on the optical absorption coefficient of the sample to be measured irradiated by the light source of at least two wavelengths, the extinction coefficient of water irradiated by the light source of at least two wavelengths, and the extinction coefficient of lipids irradiated by the light source of at least two wavelengths.

The computer readable storage media can also perform the method for measuring concentration of water and lipids components illustrated in FIG. 1, and will not be described again.

Of course, in addition to software implementation manner, the electronic apparatus in the present disclosure does not exclude other implementation manner, such as logic devices or a combination of software and hardware, which means that the execution body of the following processing processes is not limited to each logical unit, but can also be hardware or logic devices.

In summary, the above embodiments are only preferred embodiments of the present disclosure and not intended to limit the protection scope of the present disclosure. Any modification, equivalent replacement, improvement, etc. made within the spirit and principles of one or more embodiments of the present disclosure shall be included in the protection scope of one or more embodiments of the present disclosure.

The system, device, module, or unit illustrated in the above embodiments can be specifically implemented by a computer chip or entity, or by a product with a certain function. A typical implementation device is a computer. Specifically, a computer may be, for example, a personal computer, laptop computer, cellular phone, camera phone, smart phone, personal digital assistant, media player, navigation device, email device, game console, tablet computer, wearable device, or any combination of these devices.

The computer-readable media, including persistent and non-permanent, removable and non-removable media, can be implemented by any method or technology for information storage. Information may be computer readable instructions, data structures, modules of programs, and other data. Examples of computer storage media include, but are not limited to, phase-change memory (PRAM), static random access memory (SRAM), dynamic random access memory (DRAM), other types of random access memory (RAM), read only memory (ROM), Electrically Erasable Programmable Read Only Memory (EEPROM), Flash Memory and other memory technologies, Disc Read Only Memory (CD-ROM), Digital Versatile Disc (DVD) and other optical storage, magnetic cassettes, magnetic disk tape storage and other magnetic storage devices and any other non-transmission media that can be used to store information that can be accessed by computing devices. As defined herein, computer-readable media does not include computer-readable transitory media, such as modulated data signals and carrier waves.

It should also be noted that the terms "include", "comprise" and/or any other variations thereof are intended to encompass a non-exclusive inclusion, such that a process, method, article and/or device comprising a series of elements includes not only those elements, but also other elements not expressly listed or inherent to such a process, method, article and/or device. Without further limitation, an element defined by the phrase "comprise a . . . " does not preclude the presence of additional identical elements in the process, method, article and/or device that includes the element.

Each embodiment in the present disclosure is described in a progressive manner, and the same and similar parts between each embodiment can be referred to each other. Each embodiment focuses on the differences from other embodiments. In particular, for system embodiments, since they are basically similar to method embodiments, the description is relatively simple. For relevant information, please refer to the partial description of method embodiments.

The invention claimed is:

1. A method for measuring concentration of water and lipids components, comprising:

acquiring an optical absorption coefficient of a sample to be measured irradiated by a light source of two wavelengths, wherein a wavelength of the light source of two wavelengths is not greater than 1000 nm;

acquiring an extinction coefficient of water irradiated by the light source of two wavelengths and an extinction coefficient of lipids irradiated by the light source of two wavelengths; and determining a concentration of water in the sample to be measured and a concentration of lipids in the sample to be measured, respectively, based on the optical absorption coefficient of the sample to be measured irradiated by the light source of two wavelengths, the extinction coefficient of water irradiated by the light source of two wavelengths, and the extinction coefficient of lipids irradiated by the light source of two wavelengths;

wherein determining a concentration of water in the sample to be measured and a concentration of lipids in the sample to be measured, respectively, based on the optical absorption coefficient of the sample to be measured irradiated by the light source of two wavelengths, the extinction coefficient of water irradiated by the light source of two wavelengths, and the extinction coefficient of lipids irradiated by the light source of two wavelengths comprises:

determining a concentration of water in the sample to be measured and a concentration of lipids in the sample to be measured, respectively, based on the optical absorption coefficient of the sample to be measured irradiated by the light source of two wavelengths $\lambda$, the extinction coefficient of water irradiated by the light source of at least two wavelengths $\lambda$, the extinction coefficient of lipids irradiated by the light source of at least two wavelengths $\lambda$, and a formula $\mu_a(\lambda) = \varepsilon_{H2O}(\lambda) \times C_{H2O} + \varepsilon_{lipid}(\lambda) \times C_{lipid}$;

wherein, the $\mu_a(\lambda)$ is the optical absorption coefficient of the sample to be measured irradiated by the light source of two wavelengths $\lambda$; the $\varepsilon_{H2O}(\lambda)$ is the extinction coefficient of water irradiated by the light source of two wavelengths $\lambda$; the $\varepsilon_{lipid}(\lambda)$ is the extinction coefficient of lipids irradiated by the light source of two wavelengths $\lambda$; the $C_{H2O}$ is the concentration of water in the sample to be measured; and the $C_{lipid}$ is the concentration of lipids in the sample to be measured;

wherein the two wavelengths are:

930 nm;

970 nm;

wherein acquiring the optical absorption coefficient of the sample to be measured irradiated by the light source of two wavelengths comprises:

acquiring the optical absorption coefficient of the sample to be measured irradiated by the light source of two wavelengths through a spatial light modulator by an ordinary camera.

2. An electronic apparatus, comprising: a storage, a processor, and a computer program stored in the storage and executable by the processor, wherein the computer program, when executed by the processor, performs the method of claim 1.

3. A non-transitory computer readable storage media, with a computer program stored thereon, wherein the computer program, when executed by a processor, causes a processor to perform the method of claim 1.

4. A system for measuring concentration of water and lipids components, comprising a light source, a spatial light modulator, a camera, and a processor, wherein:

the light source of two wavelengths irradiates on a sample to be measured through the spatial light modulator, wherein a wavelength of the light source of two wavelengths is not greater than 1000 nm;

the camera acquires an optical absorption coefficient of the sample to be measured irradiated by the light source of two wavelengths, respectively; and the processor determines a concentration of water in the sample to be measured and a concentration of lipids in the sample to be measured, respectively, based on the optical absorption coefficient of the sample to be measured irradiated by the light source of two wavelengths, the extinction coefficient of water irradiated by the light source of two wavelengths, and the extinction coefficient of lipids irradiated by the light source of two wavelengths;

wherein determining a concentration of water in the sample to be measured and a concentration of lipids in the sample to be measured, respectively, based on the optical absorption coefficient of the sample to be measured irradiated by the light source of two wavelengths, the extinction coefficient of water irradiated by the light source of two wavelengths, and the extinction coefficient of lipids irradiated by the light source of two wavelengths comprises:

determining a concentration of water in the sample to be measured and a concentration of lipids in the sample to be measured, respectively, based on the optical absorption coefficient of the sample to be measured irradiated by the light source of two wavelengths $\lambda$, the extinction coefficient of water irradiated by the light source of two wavelengths $\lambda$, the extinction coefficient of lipids irradiated by the light source of two wavelengths $\lambda$, and a formula $\mu_a(\lambda)=\varepsilon_{H2O}(\lambda)\times C_{H2O}+\varepsilon_{lipid}(\lambda)\times C_{lipid}$;

wherein, the $\mu_a(\lambda)$ is the optical absorption coefficient of the sample to be measured irradiated by the light source of two wavelengths $\lambda$; the $\varepsilon_{H2O}(\lambda)$ is the extinction coefficient of water irradiated by the light source of two wavelengths $\lambda$; the $\varepsilon_{lipid}(\lambda)$ is the extinction coefficient of lipids irradiated by the light source of two wavelengths $\lambda$; the $C_{H2O}$ is the concentration of water in the sample to be measured; and the $C_{lipid}$ is the concentration of lipids in the sample to be measured;

wherein the two wavelengths are:

930 nm;

970 nm;

wherein acquiring the optical absorption coefficient of the sample to be measured irradiated by the light source of two wavelengths comprises:

acquiring the optical absorption coefficient of the sample to be measured irradiated by the light source of two wavelengths through a spatial light modulator by an ordinary camera.

5. A device for measuring concentration of water and lipids components, comprising:

a first acquisition module, for acquiring an optical absorption coefficient of a sample to be measured irradiated by a light source of two wavelengths, wherein a wavelength of the light source of two wavelengths is not greater than 1000 nm;

a second acquisition module, for acquiring an extinction coefficient of water irradiated by the light source of two wavelengths and an extinction coefficient of lipids irradiated by the light source of two wavelengths; and a concentration determination module, for determining a concentration of water in the sample to be measured and a concentration of lipids in the sample to be measured, respectively, based on the optical absorption coefficient of the sample to be measured irradiated by the light source of two wavelengths, the extinction coefficient of water irradiated by the light source of two wavelengths, and the extinction coefficient of lipids irradiated by the light source of two wavelengths;

wherein determining a concentration of water in the sample to be measured and a concentration of lipids in the sample to be measured, respectively, based on the optical absorption coefficient of the sample to be measured irradiated by the light source of two wavelengths, the extinction coefficient of water irradiated by the light source of two wavelengths, and the extinction coefficient of lipids irradiated by the light source of two wavelengths comprises:

determining a concentration of water in the sample to be measured and a concentration of lipids in the sample to be measured, respectively, based on the optical absorption coefficient of the sample to be measured irradiated by the light source of two wavelengths $\lambda$, the extinction coefficient of water irradiated by the light source of two wavelengths $\lambda$, the extinction coefficient of lipids irradiated by the light source of two wavelengths $\lambda$, and a formula $\mu_a(\lambda)=\varepsilon_{H2O}(\lambda)\times C_{H2O}+\varepsilon_{lipid}(\lambda)\times C_{lipid}$;

wherein, the $\mu_a(\lambda)$ is the optical absorption coefficient of the sample to be measured irradiated by the light source of two wavelengths $\lambda$; the $\varepsilon_{H2O}(\lambda)$ is the extinction coefficient of water irradiated by the light source of two wavelengths $\lambda$; the $\varepsilon_{lipid}(\lambda)$ is the extinction coefficient of lipids irradiated by the light source of two wavelengths $\lambda$; the $C_{H2O}$ is the concentration of water in the sample to be measured; and the $C_{lipid}$ is the concentration of lipids in the sample to be measured;

wherein the two wavelengths are:
  930 nm;
  970 nm;
wherein acquiring the optical absorption coefficient of the sample to be measured irradiated by the light source of two wavelengths comprises:
acquiring the optical absorption coefficient of the sample to be measured irradiated by the light source of two wavelengths through a spatial light modulator by an ordinary camera.

* * * * *